United States Patent
Ikeda

(10) Patent No.: US 12,283,000 B2
(45) Date of Patent: Apr. 22, 2025

(54) METHOD, SYSTEM, AND PROGRAM FOR GENERATING THREE-DIMENSIONAL MODEL USING PLANE SYMMETRY OR ROTATIONAL SYMMETRY

(71) Applicant: TOYOTA JIDOSHA KABUSHIKI KAISHA, Toyota (JP)

(72) Inventor: Takuya Ikeda, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 217 days.

(21) Appl. No.: 18/184,255

(22) Filed: Mar. 15, 2023

(65) Prior Publication Data

US 2023/0316648 A1 Oct. 5, 2023

(30) Foreign Application Priority Data

Apr. 4, 2022 (JP) ................. 2022-062508

(51) Int. Cl.
*G06T 17/20* (2006.01)
*G06T 7/68* (2017.01)
*G06T 17/00* (2006.01)

(52) U.S. Cl.
CPC ............. *G06T 17/20* (2013.01); *G06T 7/68* (2017.01); *G06T 17/00* (2013.01); *G06T 2210/12* (2013.01)

(58) Field of Classification Search
None
See application file for complete search history.

(56) References Cited

U.S. PATENT DOCUMENTS

| 2013/0271577 A1 | 10/2013 | Watanabe et al. |
| 2017/0103510 A1* | 4/2017 | Wang .................. G06T 7/33 |
| 2023/0311307 A1* | 10/2023 | Ikeda .................. B25J 9/1612 |
| | | 700/251 |

FOREIGN PATENT DOCUMENTS

| JP | 2012-150796 A | 8/2012 |
| JP | 2013-120091 A | 6/2013 |
| JP | 2021-85781 A | 6/2021 |

\* cited by examiner

*Primary Examiner* — Michael J Cobb
(74) *Attorney, Agent, or Firm* — Sughrue Mion, PLLC

(57) ABSTRACT

A method, a system, and a program for generating a three-dimensional model are provided. A method according to an embodiment for generating a three-dimensional model includes (1) deriving an initial reference coordinate system based on measurement data indicating a three-dimensional shape of an object (2) selecting an axis of the initial reference coordinate system (3) determining whether or not there is rotational symmetry about the axis (4) determining whether or not there is rotational symmetry with an angular period about the axis (5) when there is the rotational symmetry with the angular period, correcting a reference coordinate system (6) when there is no rotational symmetry, determining plane symmetry about the axis (7) when there is the plane symmetry, correcting the reference coordinate system and (8) performing processing of (3)-(7) for each of three axes of the initial reference coordinate system.

13 Claims, 13 Drawing Sheets

METHOD, SYSTEM, AND PROGRAM FOR GENERATING THREE-DIMENSIONAL MODEL USING PLANE SYMMETRY OR ROTATIONAL SYMMETRY

CROSS REFERENCE TO RELATED APPLICATIONS

This application is based upon and claims the benefit of priority from Japanese patent application No. 2022-062508, filed on Apr. 4, 2022, the disclosure of which is incorporated herein in its entirety by reference.

BACKGROUND

The present disclosure relates to a method, a system, and a program for generating a three-dimensional model.

Japanese Unexamined Patent Application Publication No. 2021-85781 discloses an information processing apparatus for calculating a position and a posture of an object. The information processing apparatus of Japanese Unexamined Patent Application Publication No. 2021-85781 acquires a three-dimensional shape model (edge information, point cloud information) from distance point cloud information of an object and determines rotational symmetry about a first axis. The information processing apparatus then determines inversion symmetry about a second axis, which is different from the first axis.

SUMMARY

In Japanese Unexamined Patent Application Publication No. 2021-85781, the rotational symmetry about the first axis and inversion symmetry about the second axis are determined. Therefore, it is difficult to set a coordinate axis automatically, and thus it is necessary for a human to set the coordinate axis. For this reason, it is difficult to generate three-dimensional models of various objects efficiently. In this way, it is possible to create three-dimensional models in a reference coordinate system in consideration of the symmetry of objects.

In generating three-dimensional shape models, it is possible to annotate appropriate information, for example, by setting a coordinate axis that takes into consideration the symmetry of objects. Therefore, it is possible to generate learning data added with position and posture information about the position and the posture of objects. An estimator of an object can be generated by supervised learning in which the position and posture information about the object is the correct label (teacher data).

The present disclosure has been made to solve such problems and provides a method, a system, and a program for generating a three-dimensional model that can efficiently generate a three-dimensional model in an appropriate coordinate system.

A method according to an embodiment for generating a three-dimensional model performed by at least one processor includes: (1) deriving an initial reference coordinate system based on measurement data indicating a three-dimensional shape of an object; (2) selecting an axis of the initial reference coordinate system; (3) determining whether or not there is rotational symmetry about the axis; (4) determining whether or not there is rotational symmetry with an angular period about the axis; (5) when there is no rotational symmetry, determining plane symmetry about the axis; and (6) performing processing of (3)-(5) for each of three axes of the initial reference coordinate system by changing the axis selected in (2).

In the above method, when there is the rotational symmetry with the angular period or when there is the plane symmetry, the initial reference coordinate system may be corrected.

In the above method, the initial reference coordinate system may be derived based on a direction of a normal to each mesh of a mesh model indicating the three-dimensional shape.

In the above method, a cuboid containing the object may be used as a three-dimensional bounding box and a center of the cuboid may be used as an origin, and then the initial reference coordinate system may be derived with each side direction of the cuboid as an xyz axis.

In the above system, when there is the plane symmetry, an axial direction of the initial reference coordinate system may be corrected to have an axis along an inverted plane of the plane symmetry.

In the above method, when there is the rotational symmetry with the angular period, an axial direction of the initial reference coordinate system may be corrected based on a peak plane.

A system according to the embodiment for generating a three-dimensional model includes at least one processor, the processor performing: (1) deriving an initial reference coordinate system based on measurement data indicating a three-dimensional shape of an object; (2) selecting an axis of the initial reference coordinate system; (3) determining whether or not there is rotational symmetry about the axis; (4) determining whether or not there is rotational symmetry with an angular period about the axis; (5) when there is no rotational symmetry, determining plane symmetry about the axis; and (6) performing processing of (3)-(5) for each of three axes of the initial reference coordinate system by changing the axis selected in (2).

In the above system, when there is the rotational symmetry with the angular period or when there is the plane symmetry, the initial reference coordinate system may be corrected.

In the above system, the initial reference coordinate system may be derived based on a direction of a normal to each mesh of a mesh model indicating the three-dimensional shape.

In the above system, a cuboid containing the object may be used as a three-dimensional bounding box and a center of the cuboid may be used as an origin, and then the initial reference coordinate system may be derived with each side direction of the cuboid as an xyz axis.

In the above system, when there is the plane symmetry, an axial direction of the initial reference coordinate system may be corrected to have an axis along an inverted plane of the plane symmetry.

In the above system, when there is the rotational symmetry with the angular period, an axial direction of the initial reference coordinate system may be corrected based on a peak plane.

A program according to the embodiment causes a computer to execute a method for generating a three-dimensional model, the method including: (1) deriving an initial reference coordinate system based on measurement data indicating a three-dimensional shape of an object; (2) selecting an axis of the initial reference coordinate system; (3) determining whether or not there is rotational symmetry about the axis; (4) determining whether or not there is rotational symmetry with an angular period about the axis; (5) when there is no rotational symmetry, determining plane symmetry about the axis; and (6) performing processing of (3)-(5) for each of three axes of the initial reference coordinate system by changing the axis selected in (2).

According to the present disclosure, it is possible to provide a method, a system, and a program for generating a three-dimensional model that can efficiently generate a three-dimensional model in an appropriate coordinate system.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, the present disclosure is described through an embodiment of the disclosure, but the present disclosure according to the claims is not limited to the following embodiment. Moreover, not all of the configurations described in the embodiment are essential as means to solve the problem.

In recent years, machine learning models have been used as estimators to estimate the positions and postures of objects. To generate such estimators by machine learning, a large amount of learning data needs to be collected. The learning data may include not only images captured by a camera but also composite images generated by simulations.

Renderers and simulators generate composite images from three-dimensional models (also referred to as three-dimensional shape models or 3D models) that show the three-dimensional shapes of objects. By using a simulator or the like, a large number of composite images with different positions and postures of an object can be easily generated. Furthermore, the simulator or the like can annotate labels such as positions and postures to the composite images.

Sensors such as stereo cameras and depth sensors are used to create the three-dimensional models. For example, a depth sensor measures point cloud data of an object. The point cloud data includes, for example, information about position coordinates of respective points in an XYZ three-dimensional orthogonal coordinate system. The three-dimensional model can also be formed by converting the point cloud data into edge data, mesh data, surface data, or the like.

Here, in the three-dimensional model indicating the three-dimensional shape of the object, it is desirable to set coordinate axes of a coordinate system appropriately. For example, if the object is rotationally symmetric, the position and posture of the object can be appropriately changed by setting a coordinate axis that matches a rotation axis. It is desirable to determine the symmetry of the object appropriately. In the method according to this embodiment, the symmetry of the object can be determined appropriately. In this way, it becomes possible to set a useful coordinate system for the estimation of a six-axis position and posture in the estimator.

Figure 1:
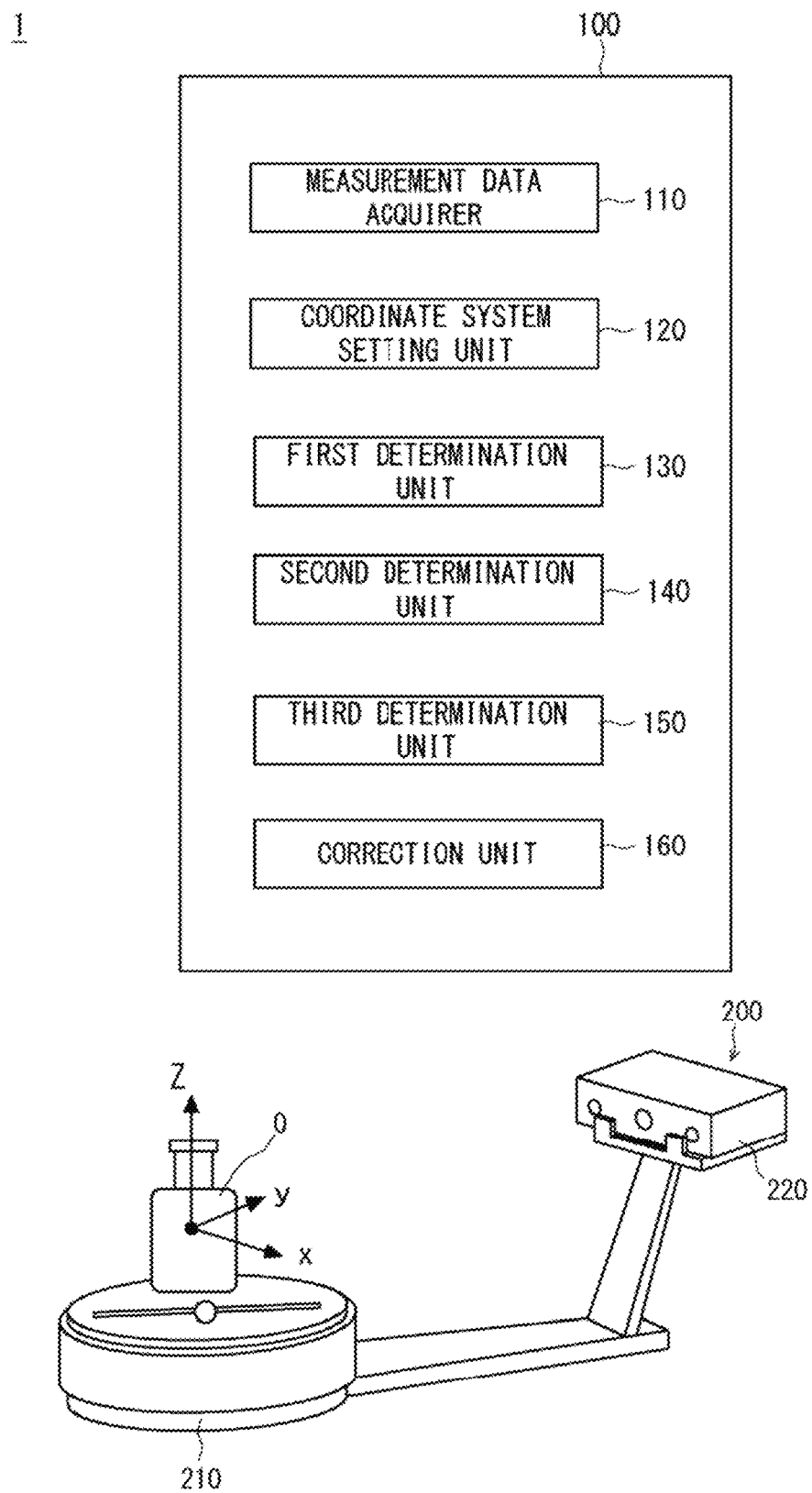
FIG. 1 is a schematic diagram showing a system configuration.

The system and method for generating a three-dimensional model according to this embodiment will be described with reference to the drawings. FIG. 1 is a block diagram showing a configuration of a system 1. The system 1 includes a processing apparatus 100 and a sensor 200. The processing apparatus 100 performs processing to determine the symmetry of an object O.

The sensor 200 is a measuring instrument for measuring a three-dimensional shape of the object O. The sensor 200 is, for example, a three-dimensional scanner. The sensor 200 includes a table 210 and a depth sensor 220. The table 210 has a mounting surface parallel to a horizontal plane. A user or robot places the object O to be measured on the table 210. The depth sensor 220 measures a distance to the object O on the table 210. In this manner, a depth image can be captured. The table 210 rotates the object O about a rotation axis parallel to the vertical direction. While the table 210 rotates the object O, the depth sensor 220 measures a distance to the surface of the object O.

In this way, the sensor 200 can obtain measurement data indicating a three-dimensional shape of an entire circumference of the object O. The measurement data has a plurality of ranging data pieces indicating the distance from the depth sensor 220 to the object O. Since the object O can be measured during the rotation of the table 210, the distance from any direction to the surface of the object O can be measured. Furthermore, in order to measure the shape of the bottom or top surface of the object O, the sensor 200 may perform the measurement by changing the orientation of the object O on the table 210.

The measurement data measured by the sensor 200 is, for example, point cloud data including a plurality of points. Each point includes information about three-dimensional coordinates in a sensor coordinate system. The measurement data may be mesh data. The mesh data is composed of a triangular mesh (tri-mesh) connecting three adjacent points and a square mesh (quad-mesh) connecting four adjacent points. The sensor 200 outputs the measurement data to the processing apparatus 100.

The processing apparatus 100 is an information processing apparatus of a personal computer. For example, the processing apparatus 100 includes a memory, a processor, various interfaces, an input device, an output device, a monitor, and so on. When the processor of the processing apparatus 100 executes a program stored in the memory, the processing described later is performed. Furthermore, the processing apparatus 100 is an information processing apparatus that can communicate in a wireless or wired manner.

The processing apparatus 100 includes a measurement data acquisition unit 110, a coordinate system setting unit 120, a first determination unit 130, a second determination unit 140, a third determination unit 150, and a correction unit 160.

The measurement data acquisition unit 110 acquires the measurement data measured by the sensor 200. As described above, the measurement data is the point cloud data and the mesh data indicating the three-dimensional shape of the object. That is, the processing apparatus 100 acquires data (three-dimensional data) of the three-dimensional model indicating the three-dimensional shape. Hereinafter, the measurement data acquisition unit 110 is described as acquiring the mesh model indicating the three-dimensional shape. Obviously, the measurement data acquisition unit 110 may acquire the point cloud data from the sensor 200, and the processing apparatus 100 may generate the mesh data from the point cloud data.

The coordinate system setting unit 120 sets a reference coordinate system for the three-dimensional model indicated by the measurement data. In order to do so, the coordinate system setting unit 120 first derives an initial reference coordinate system. An XYZ three-dimensional orthogonal coordinate system is set as the initial reference coordinate system. The coordinate system setting unit 120 sets an origin and directions of the X, Y, and Z axes for the three-dimensional model. The X, Y, and Z axes are directions perpendicular to each other.

The first determination unit 130 determines rotational symmetry of the object O. The first determination unit 130 determines whether or not, for each of the three axes, the object O has rotational symmetry. For example, for the X-axis, if the object O has a rotationally symmetric shape, the X-axis is a rotationally symmetric axis. Thus, if the object is rotated at an angle around the X-axis, the shape of the object will match the original shape thereof.

The second determination unit 140 determines whether or not the object O is rotationally symmetric with an angular period. If there is a rotationally symmetric axis, the second determination unit 140 determines whether or not the rotational symmetry about that axis has an angular period. For example, if the X-axis is a rotationally symmetric axis, the second determination unit 140 determines whether or not the X-axis has a rotationally symmetric shape with an angular period.

An example of the rotationally symmetric shape with an angular period is a regular polygon in a cross section perpendicular to the axis. Specifically, if the cross section is square, the object will have a four-fold rotational symmetric shape. An example of a rotationally symmetric shape without an angular period is, for example, circular in a cross section perpendicular to the axis.

The third determination unit 150 determines the plane symmetry. When an object shape has plane symmetry, the shape is inversely symmetric with respect to the plane. When the object shape is inversely symmetric with respect to the plane including an axis, the third determination unit 150 determines that the object is plane symmetric.

The correction unit 160 corrects the reference coordinate system. When the second determination unit 140 determines that the object is rotational symmetric with an angular period, the correction unit 160 corrects the reference coordinate system. By doing so, a reference coordinate system different from the initial reference coordinate system is set. Specifically, the correction unit 160 corrects an orientation of an axis that is not a rotationally symmetric axis. For example, if the X-axis is a rotationally symmetric axis, the correction unit 160 changes the orientations of the Y-axis and the Z-axis. The correction unit 160 rotates the Y-axis and the Z-axis around the X-axis.

When the third determination unit 150 determines that the object O has plane symmetry, the correction unit 160 corrects the reference coordinate system. That is, the axial direction of the reference coordinate system is changed so that the axis is included within the plane of symmetry. In this way, the reference coordinate system can be set with two axes parallel to the plane of symmetry as the coordinate axes.

Figure 2:
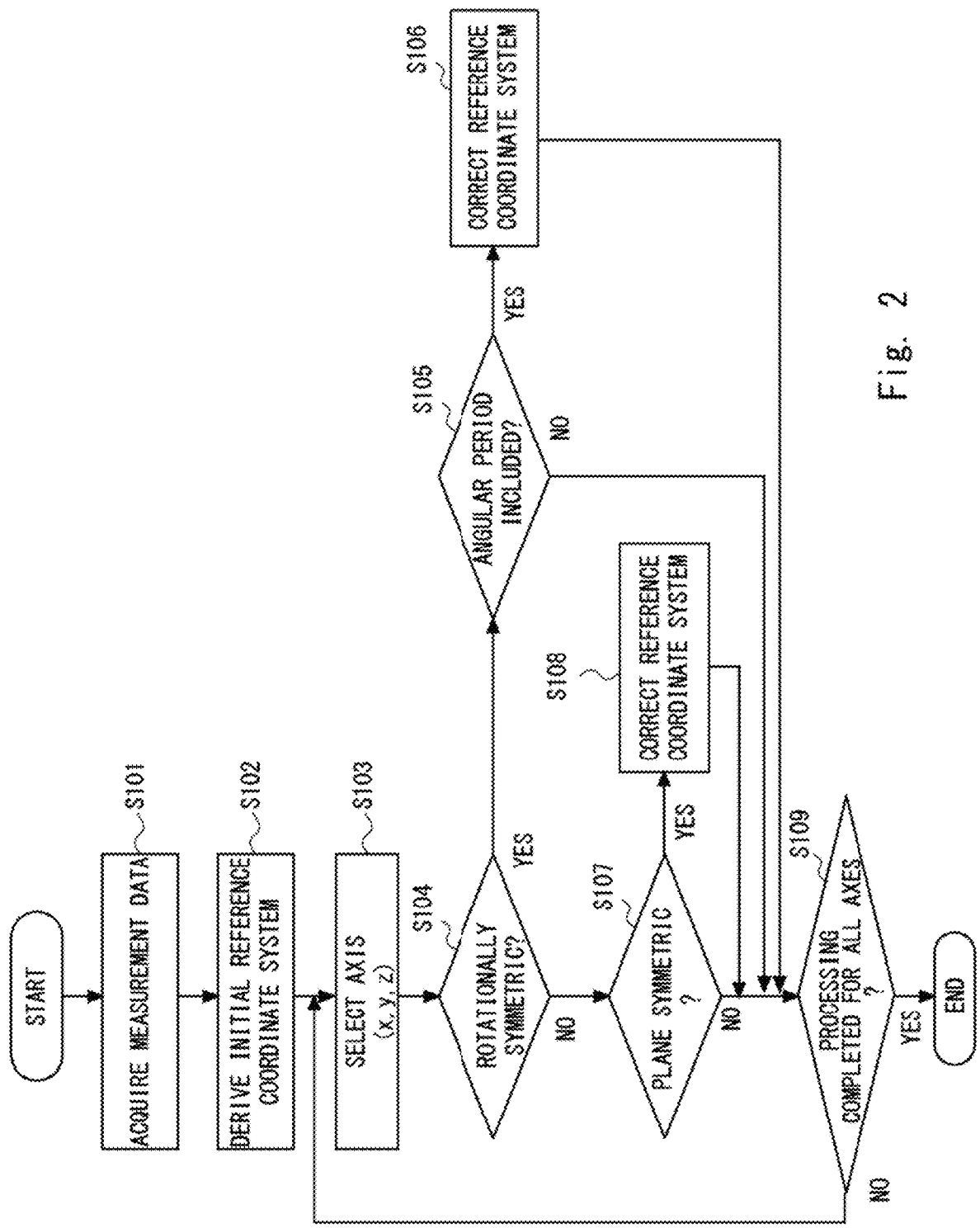
FIG. 2 is a flowchart showing a method for generating a three-dimensional model according to an embodiment.

The method for generating a three-dimensional model according to this embodiment will be described using FIG. 2. FIG. 2 is a flowchart showing the method for generating a three-dimensional model according to this embodiment.

The measurement data acquisition unit 110 acquires the measurement data measured by the sensor 200 (S101). The measurement data is, for example, the point cloud data or the mesh data. Here, the measurement data is the mesh data. Alternatively, the processing apparatus 100 may convert the point cloud data into a triangular mesh model. The coordinate system setting unit 120 derives the initial reference coordinate system for the measurement data (S102). The initial reference coordinate system is a three-dimensional rectangular coordinate system and has x-axis, y-axis, and z-axis that are perpendicular to each other. Details of this processing are described later.

The first determination unit 130 selects an axis (x, y, z) in the initial reference coordinate system (S103). That is, the first determination unit 130 selects one axis from the x-axis, y-axis, and z-axis. The first determination unit 130 determines whether or not the object O is rotationally symmetric about the selected axis (S104). The rotationally symmetric shape is a shape whose shape when rotated about the selected axis matches the original shape thereof.

When the object O is rotationally symmetric (YES in S104), the second determination unit 140 determines whether or not the rotational symmetry has an angular period (S105). That is, the third determination unit 150 determines whether or not the object O has a rotationally symmetric shape with an angular period. A rotationally symmetric shape with an angular period is a shape whose shape matches the original shape thereof when rotated around the selected axis by a predetermined angle (an angle greater than 0 degrees and less than 360 degrees). In other words, the shape when rotated around the axis by an angle other than the angle indicated by the angular period does not match the original shape thereof.

If the rotational symmetry has an angular period (YES in S105), the correction unit 160 corrects the reference coordinate system (S106). The correction unit 160 changes the directions of two axes other than the selected axis in the initial reference coordinate system. This determines the directions of the two axes in the plane perpendicular to the selected axis. Next, the processing transitions to Step S109. If the rotational symmetry does not have an angular period (NO in S105), the processing transitions to Step S109.

If the shape of the object O is not rotationally symmetric (NO in S104), the third determination unit 150 determines whether or not the shape of the object O is plane symmetric (S107). The plane symmetric shape is a shape of the object O in which the shape when the object O is inverted matches the original shape thereof in the plane including the selected axis. If the shape of the object O is plane symmetric (YES in S107), the correction unit 160 corrects the reference coordinate system (S108). The correction unit 160 changes the directions of two axes other than the selected axis in the initial reference coordinate system. Specifically, one axis other than the selected axis is made parallel to the plane of symmetry (inverted plane of the plane symmetry). Then, the processing transitions to S109.

If the object O is not plane symmetric (NO in S107), the processing transitions to S109. Next, the first determination unit 130 determines whether or not the processing is completed for all axes (S109). If the processing is not completed for all axes (NO in S109), the processing returns to Step S103, and the first determination unit 130 selects an axis. That is, the processing apparatus 100 performs the above processing for the axis whose symmetry has not been determined. For example, the processing of S104 to S108 is performed in the order of the z-axis, the y-axis, and the x-axis. If the processing is completed for all axes (YES in S109), the processing is ended.

Figure 3:
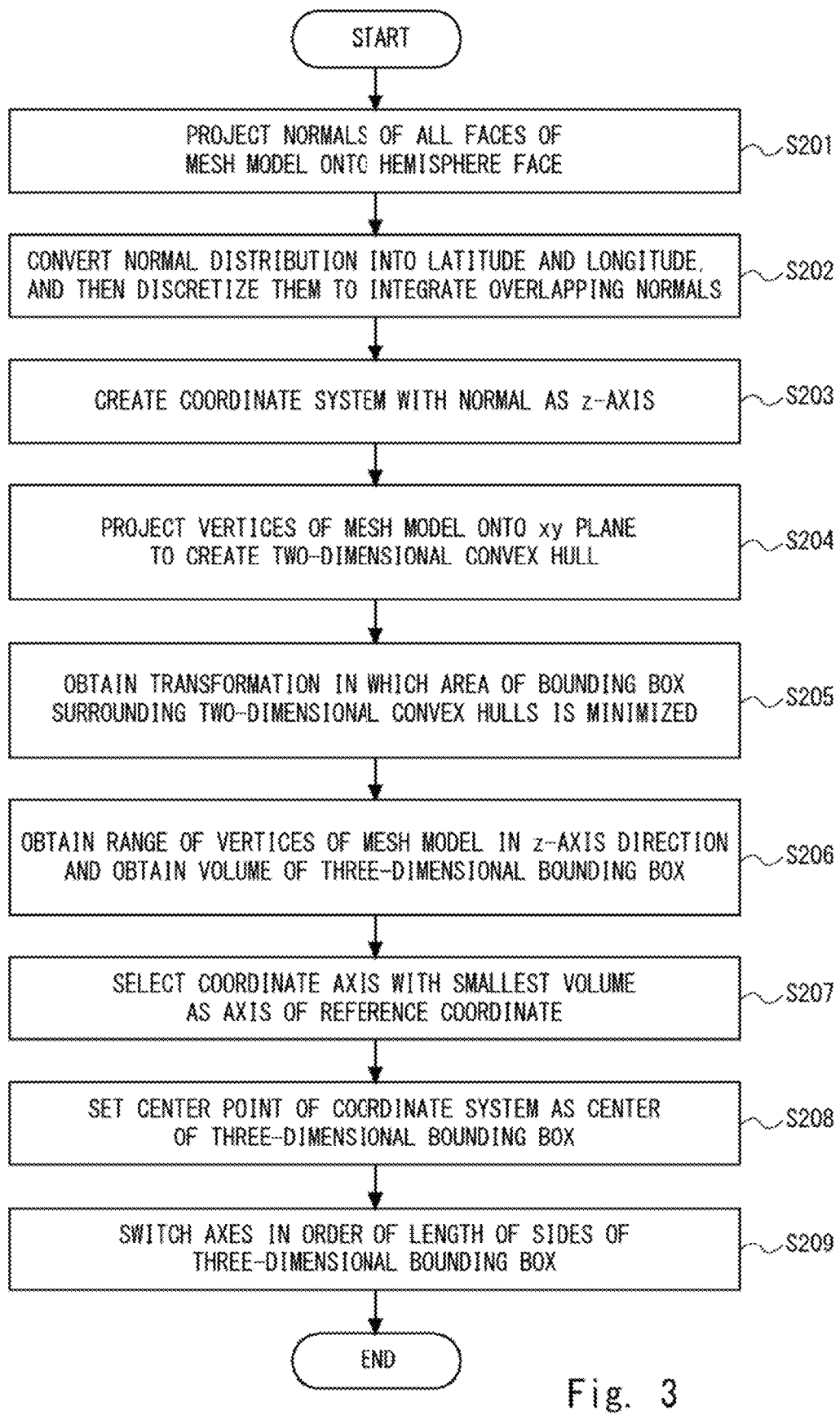
FIG. 3 is a flowchart showing processing of setting an initial reference coordinate system.

The processing of deriving the initial reference coordinate system in Step S102 will be described with reference to FIG. 3. FIG. 3 is a flowchart for describing the processing in the coordinate system setting unit 120.

The coordinate system setting unit 120 projects normals of all the faces of the mesh model onto a hemisphere face (S201). The coordinate system setting unit 120 obtains the normals (hereafter also referred to as mesh normals) perpendicular to the faces of each mesh (also referred to as mesh faces). As described below, the coordinate system setting unit 120 derives the initial reference coordinates based on the direction of the mesh normals. Thus, an appropriate initial reference coordinate system can be easily decided. The number of mesh normals obtained here corresponds to the number of mesh faces. That is, if the number of mesh faces in the mesh model for the object O is n, where n is an integer greater than or equal to 2, then the number of mesh normals is n.

The coordinate system setting unit 120 projects the normals on the hemispherical face onto a hemispherical face. For example, the coordinate system setting unit 120 generates a hemisphere containing an object. The coordinate system setting unit 120 projects the mesh normals at positions perpendicular to the hemispherical face. Specifically, the mesh normal is parallel to the normal on the hemispherical face at a certain position (one point) of the hemispherical face. The coordinate system setting unit 120 projects the normal at a position on the hemispherical face where the mesh normal become parallel to the normal on the hemispherical face. In this way, the coordinate system setting unit 120 projects the mesh normals on the hemispherical face according to the directions of the mesh normals. The two mesh normals with the same direction are projected at the same position on the hemispherical face.

The coordinate system setting unit 120 converts the normal distribution into latitude and longitude, and then discretizes them to integrate (eliminate) the overlapping normals (S202). For example, the coordinate system setting unit 120 calculates the latitude and longitude of the position of the hemispherical face where the mesh normal is projected. The coordinate system setting unit 120 stores the latitude and longitude for each normal. The coordinate system setting unit 120 integrates the normals whose latitudes and longitudes are close as overlapping normals. That is, if a difference between latitudes of the two normals and a difference between the longitudes of the two normals is less than or equal to a predetermined value, the two normals are integrated into one. The latitudes and longitudes of the normals integrated into one may be an average value of the latitudes and longitudes of the two normals. Alternatively, the latitudes and longitudes of the normals integrated into one may be the latitude and longitude of one of the normals. For example, the number of normals before being integrated may be n, where n is an integer greater than or equal to 2, and the number of normals after being integrated may be m, where m is an integer greater than or equal to 2 and less than or equal to n.

For each normal, the coordinate system setting unit 120 creates a coordinate system with the normal as the z-axis (S203). Here, an xyz three-dimensional orthogonal coordinate system with the x-axis and the y-axis perpendicular to the z-axis is set. The number of coordinate systems to be created is the same as m, which is the number of normals after being integrated (m is an integer greater than or equal to 2). That is, the coordinate system setting unit 120 creates m coordinate systems. The direction of the z-axis depends on the position of the hemispherical face where the mesh normals are projected. Thus, m coordinate systems have different axial directions.

The coordinate system setting unit 120 projects the vertices of the mesh model onto the xy plane to create a two-dimensional convex hull (S204). A two-dimensional convex hull is the smallest polygon that contains all given points. In other words, in an xy plane view, a two-dimensional convex hull contains the object O. The coordinate system setting unit 120 creates a two-dimensional convex hull that contains all the vertices of the mesh model on the xy plane of each coordinate system. Here, the coordinate system setting unit 120 can create a two-dimensional convex hull using a known algorithm. Since m coordinate systems are set here, m two-dimensional convex hulls are created. The planes on which m two-dimensional convex hulls are created are different planes.

The coordinate system setting unit 120 obtains a transformation in which an area of the bounding box surrounding the two-dimensional convex hulls is minimized (S205). The bounding box is defined in the xy plane as a rectangle containing the two-dimensional convex hull. Next, the coordinate system setting unit 120 generates a rectangle containing the two-dimensional convex hull and having the smallest area as the bounding box. Here, the bounding box is obtained for each coordinate system. Therefore, the coordinate system setting unit 120 generates m bounding boxes. The bounding box contains all the vertices of the mesh model in the xy plane.

Figure 4:
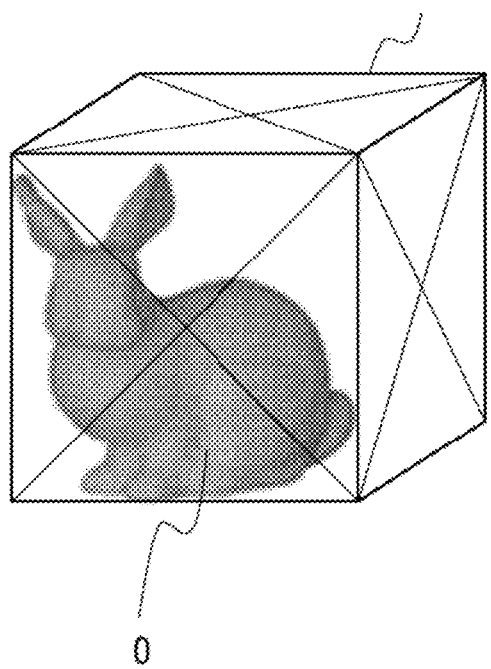
FIG. 4 is a diagram for explaining a three-dimensional bounding box.

The coordinate system setting unit 120 obtains a range of the vertices of the mesh model in the z-axis direction and obtains a volume of the three-dimensional bounding box (S206). As shown in FIG. 4, the three-dimensional bounding box is a cuboid containing an object. In other words, the three-dimensional bounding box is a cuboid containing all the vertices of the mesh model. The coordinate system setting unit 120 sets a three-dimensional bounding box whose base is a rectangle surrounding the two-dimensional convex hull in the xy plane. That is, the rectangle corresponding to the bounding box obtained in Step S205 defines the size of the three-dimensional bounding box in the x and y directions. The length from the vertex on the most +z side to the vertex on the most −z side defines the size of the three-dimensional bounding box in the z direction.

In this way, the coordinate system setting unit 120 can obtain the volume of the three-dimensional bounding box. The coordinate system setting unit 120 calculates a product of the area of the smallest rectangle surrounding the two-dimensional convex hull and the z-axis size as the volume of the three-dimensional bounding box. For each coordinate system, the coordinate system setting unit 120 determines the three-dimensional bounding box and obtains its volume. Since m coordinate systems are set as described above, the coordinate system setting unit 120 calculates the volumes of m three-dimensional bounding boxes.

The coordinate system setting unit 120 sets the coordinate axis of the three-dimensional bounding box with the smallest volume as the axis of the reference coordinate system (S207). That is, the coordinate system setting unit 120 compares the volumes of the m three-dimensional bounding boxes to obtain the three-dimensional bounding box with the smallest volume. The coordinate system setting unit 120 selects the smallest three-dimensional bounding box from among the m three-dimensional bounding boxes. Next, the direction of each side of the extracted three-dimensional bounding box is set as the axial direction. Therefore, the x-axis, y-axis, and z-axis are parallel to the respective sides of the three-dimensional bounding box as shown in FIG. 4.

The coordinate system setting unit 120 sets a center point (origin) of the coordinate system as the center of the selected three-dimensional bounding box (S208). The coordinate system setting unit 120 defines the cuboid containing the object O as the three-dimensional bounding box. Next, the coordinate system setting unit 120 derives the initial reference coordinate system with the center of the cuboid as the origin and each side direction of the cuboid as the xyz axis. The coordinate system setting unit 120 switches the axes in order of the length of the sides of the three-dimensional bounding box (S209). For example, the x-axis, the y-axis, and the z-axis are set in order of the length of the sides. In this way, the coordinate system setting unit 120 can determine the initial reference coordinate system.

Figure 5:
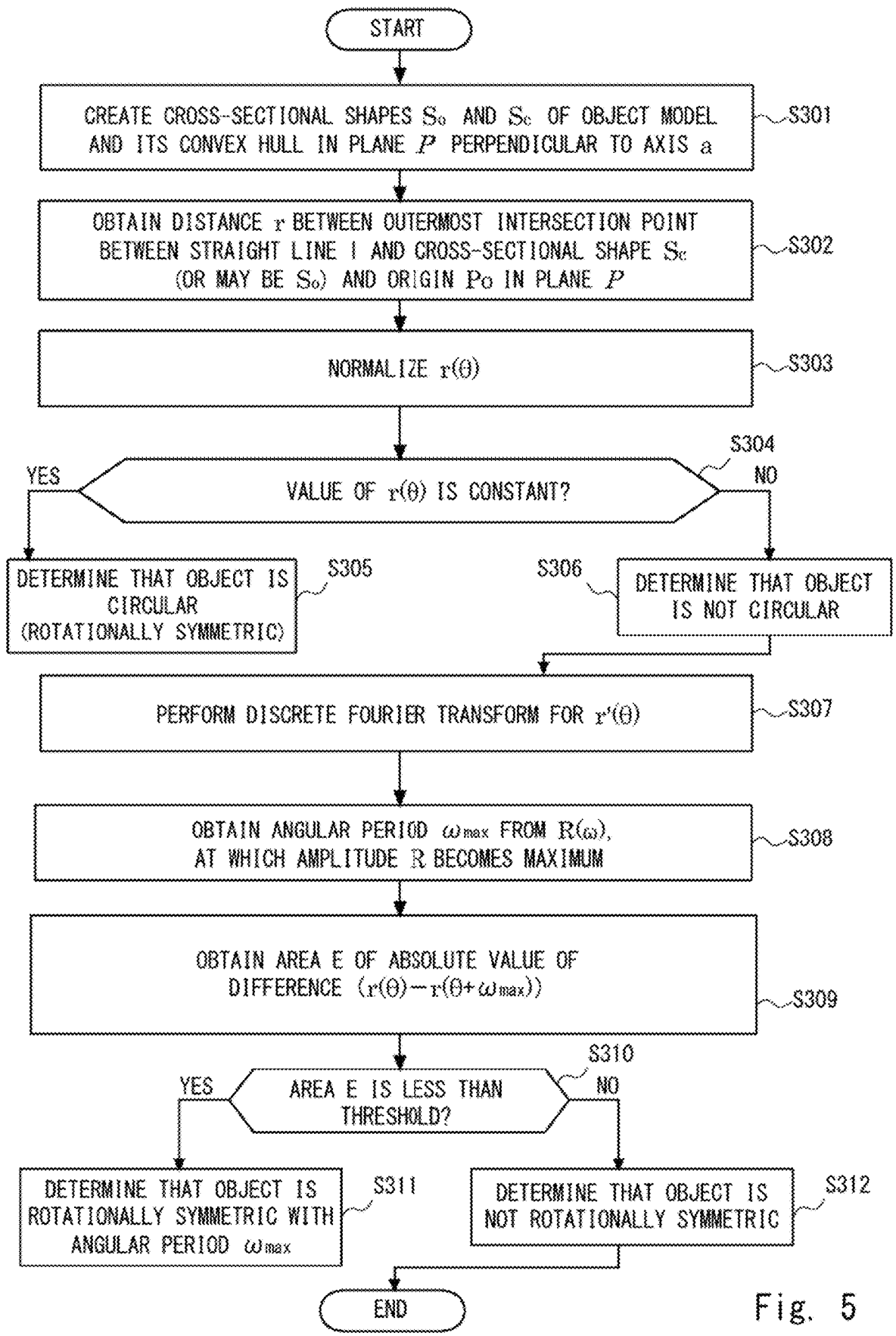
FIG. 5 is a flowchart showing processing of determining rotational symmetry.

FIG. 5 is a flowchart for describing one example of determination processing in the first determination unit 130 and the second determination unit 140. Here, the axis selected in Step S103 of the drawing is described as "a". That is, the axis a is one of the x-axis, y-axis, or z-axis in the initial reference coordinate system. In the following description, the axis a is described as the z-axis and a plane P perpendicular to the axis a is described as the xy plane.

In the plane P perpendicular to the axis a, the first determination unit 130 creates cross-sectional shapes So and Sc of an object model and its convex hull (S301). The cross-sectional shapes So and Sc are obtained from the intersection of the plane P and the object model. The cross-sectional shape So of the object is the shape showing an outline of the object in the plane P. The convex hull is the smallest polygon in the plane P containing the object (i.e., the cross-sectional shape So). The first determination unit 130 changes the position on the axis a to generate the cross-sectional shapes So and Sc. Therefore, for one object O, the first determination unit 130 generates a plurality of cross-sectional shapes So and a plurality of cross-sectional shapes Sc.

Figure 6:
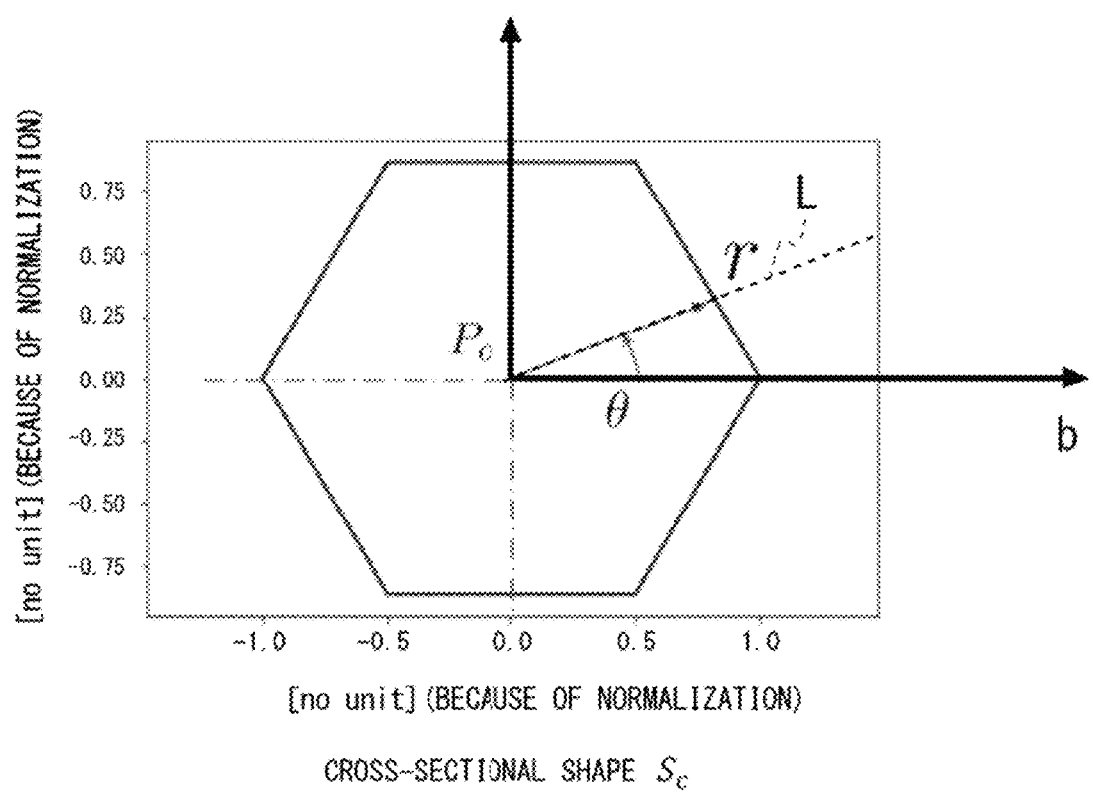
FIG. 6 is a diagram for explaining a cross-sectional shape $1c$ and $r(\theta)$ of a convex hull of an object.

The first determination unit 130 obtains a distance r between the outermost intersection point between a straight line 1 and the cross-sectional shape Sc (or may be So) and an origin Po in the plane P (S302). The cross-sectional shape Sc and its r are described with reference to FIG. 6. FIG. 6 shows the plane P. Here, the straight line 1 is parallel to the plane P and passes through the origin Po of the plane P, as shown in FIG. 6. Further, the straight line 1 starts at the origin P0. An angle formed by the straight line 1 and the x-axis in the plane P is θ. On the straight line 1, the distance r indicates the distance between the origin Po and the outer shape of the cross-sectional shape Sc. If there are two or more intersection points between the straight line 1 and the cross-sectional shape Sc, the distance between the outermost intersection point and the origin Po is defined as r.

As described above, the first determination unit 130 may use the cross-sectional shape So of the object model instead of the cross-sectional shape Sc. Therefore, it is also possible to replace the cross-sectional shape Sc with the cross-sectional shape So in the following flow. When the cross-sectional shape So is used, the distance from the origin Po to the outer shape of the cross-sectional shape So on the straight line 1 is defined as the distance r. In the following description, an example of processing for the cross-sectional shape Sc is described. Therefore, as shown in FIG. 6, the distance from the origin Po to the intersection point between the straight line 1 and the cross-sectional shape Sc is described as the distance r.

Furthermore, the first determination unit 130 gradually changes θ to obtain the distance r. That is, in the plane P, the first determination unit 130 calculates r over the entire circumference of the circle around the origin Po. The first determination unit 130 obtains r by, for example, changing θ at intervals $\delta_\theta$. Thus, the first determination unit 130 can obtain a discrete function r(θ). For example, θ takes a discrete value from 0 degrees to 360 degrees. r(θ) is a polar coordinate representation of the cross-sectional shape Sc. That is, r(θ) corresponds to a function obtained by transforming the polar coordinate of the cross-sectional shape Sc. Furthermore, the first determination unit 130 calculates r(θ) for each of the plurality of cross-sectional shapes Sc generated by changing the position on the axis a (in this case, the z position).

The first determination unit 130 normalizes r(θ) (S303). For example, the first determination unit 130 multiplies r(θ) by a constant coefficient so that the maximum value of r(θ) becomes 1. As a result, r(θ) falls within a range from 0 to 1. The first determination unit 130 determines whether or not the value of r(θ) is constant (S304). That is, the first determination unit 130 determines whether or not the cross-sectional shape Sc is circular. More specifically, the first determination unit 130 determines whether or not the outer shape of the cross-sectional shape Sc is circular.

When r(θ) is constant (YES in S304), the first determination unit 130 determines that the object is circular (rotationally symmetric) (S305). When it is determined that the object is circular, the processing of the first determination unit 130 and the second determination unit 140 ends. That is, the determination in Step S105 of FIG. 2 becomes NO. Examples of three-dimensional objects whose cross-sectional shapes are circular include spheres, cylinders, cones, and rugby balls. Other examples of three-dimensional objects whose cross-sectional shapes are circular include jars, bottles, and others whose diameters vary depending on the position of axis a. These shapes are rotationally symmetric about the central axis.

When r(θ) is not constant (NO in S304), the first determination unit 130 determines that the object is not circular (S306). Next, the second determination unit 140 determines whether or not the object has rotational symmetry with an angular period. That is, the determination processing in Step S105 of FIG. 2 is performed.

Figure 7:
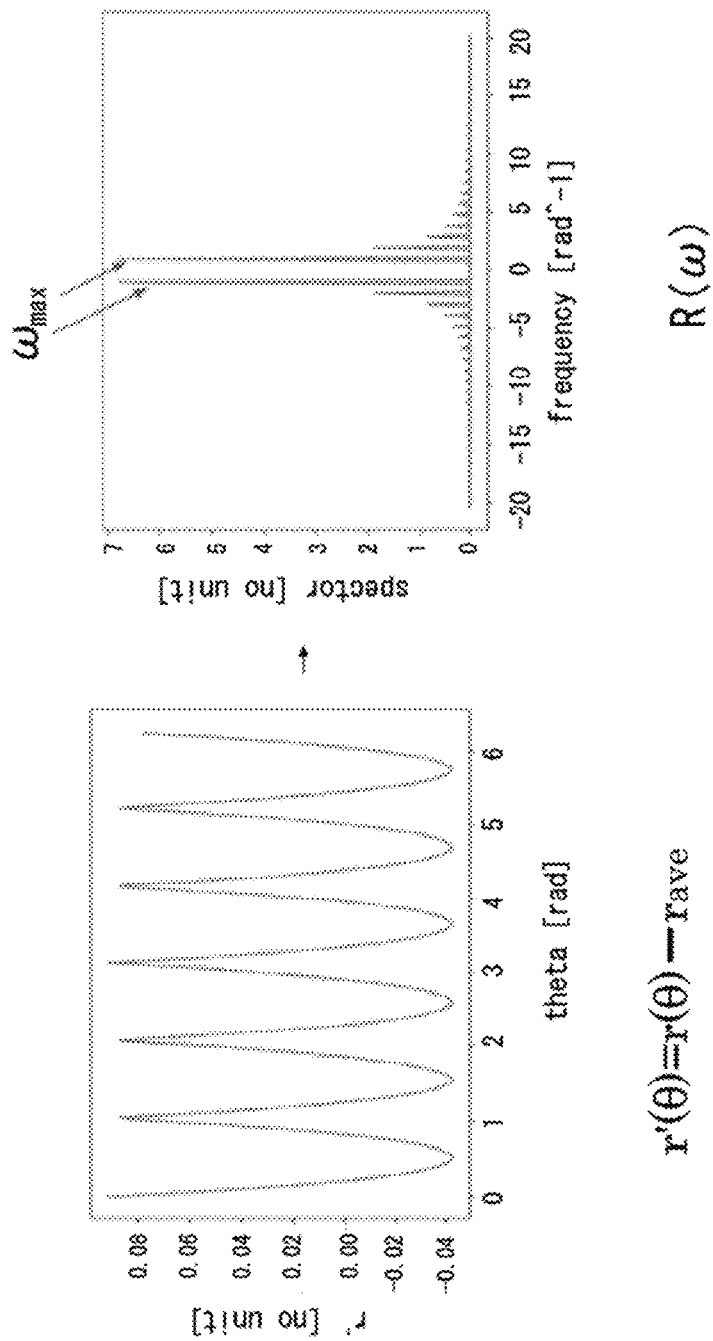
FIG. 7 is a graph showing $r'(\theta)$ and its Fourier transform.

The second determination unit 140 performs a discrete Fourier transform for r'(θ) (S307). Here, r'(θ) is calculated from r(θ) and an average value of r and $r_{ave}$. Specifically, r'(θ)=r(θ)−$r_{ave}$. The average value $r_{ave}$ corresponds to the DC component of r. The Fourier series (amplitude spectrum) R(ω) obtained by the discrete Fourier transform is shown in FIG. 7. The graph on the left side of FIG. 7 shows r'(θ) and the graph on the right side thereof shows R(ω). Note that when the cross-sectional shape Sc is a regular hexagon as shown in FIG. 6, there is a peak every 60 degrees in R(ω) shown in FIG. 7. Also, in FIG. 7, the real function is Fourier transformed, so the graph is symmetrical on the negative and positive sides.

The second determination unit 140 obtains an angular period $\omega_{max}$ from R(ω), at which an amplitude R becomes maximum (S308). Here, $\omega_{max}$ is 0 degrees or more and 180 degrees or less. In FIG. 7, the highest peak appears at R (60 degrees), so $\omega_{max}$ is 60 degrees (=π/3 [rad]).

The second determination unit 140 obtains an area E of an absolute value of a difference (r(θ)−r(θ+$\omega_{max}$)) (S309). Here, the difference indicates a difference value between the function r(θ) and the function r(θ+$\omega_{max}$) obtained by shifting the function r(θ) by the angular period $\omega_{max}$. The area E of the absolute value can be calculated by the following Expression (1).

[Expression 1]

$$E = \int_{360°}^{0°} |r(\theta) - r(\theta + \omega_{max})| d\theta \quad (1)$$

The area E is obtained by integrating the absolute value over a range of 0 degrees to 360 degrees for θ. Note that in Expression (1), since θ takes discrete values, the area E is the total sum of the absolute values within the range of 0 to 360°. The second determination unit 140 determines whether or not the area E is less than the threshold (S310). That is, the third determination unit 150 compares the area E with a preset threshold.

If the area E is less than the threshold (YES in S310), the second determination unit 140 determines that the object is rotationally symmetric (linearly symmetric) with the angular period $\omega_{max}$ (S311). That is, since the difference in the function when shifted by the angular period $\omega_{max}$ is small, the second determination unit 140 determines that the object is rotationally symmetric (linearly symmetric) with the angular period. If the area E is not less than the threshold (NO in S310), the second determination unit 140 determines that the object is not rotationally symmetric (linearly symmetric) with the angular period (S312).

Figure 8:
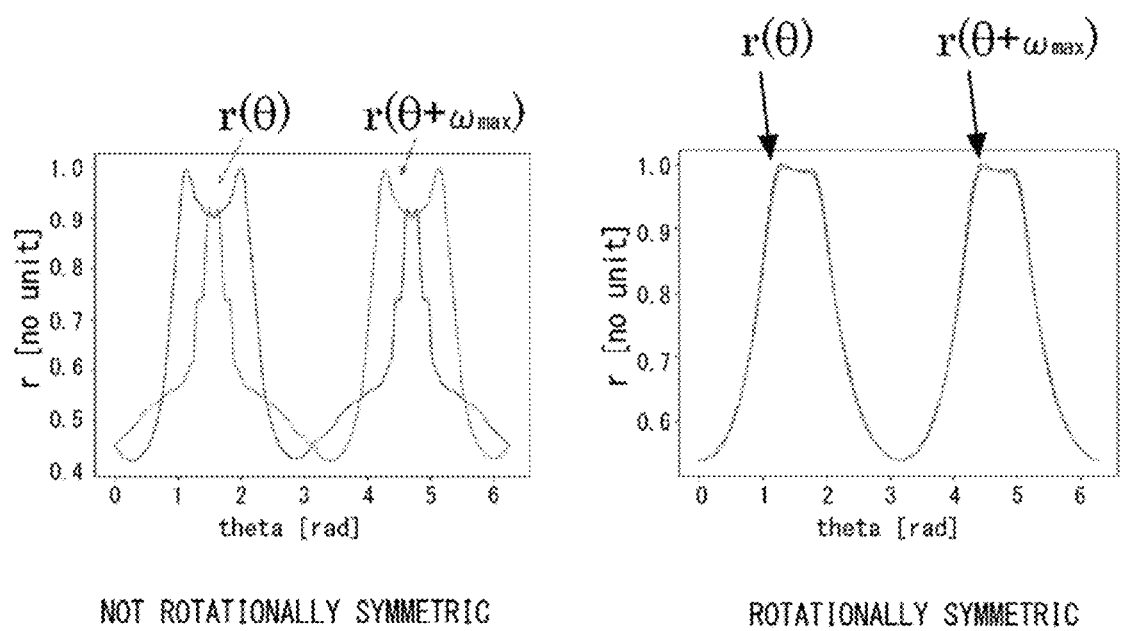
FIG. 8 is a graph showing a difference between $r(\theta)$ and $r(\theta + \omega_{max})$.

FIG. 8 shows r(θ) and r(θ+$\omega_{max}$). A graph on the left side of FIG. 8 is for an object that does not have a rotationally symmetric shape and a graph on the right side of FIG. 8 is for an object that has a rotationally symmetric shape. When the object is not rotationally symmetric, the difference between r(θ) and r(θ+$\omega_{max}$) is not zero, and thus the area E obtained by Expression (1) becomes large. When the object is rotationally symmetric with an angular period, the function r(θ) substantially matches the function r(θ+$\omega_{max}$). Therefore, the difference between r(θ) and r(θ+$\omega_{max}$) becomes almost zero and the area E becomes almost zero for any θ. Therefore, by comparing the area E with a preset threshold, the second determination unit 140 can determine whether or not the shape of the object is rotational symmetric with an angular period.

By changing the position on the axis a, a plurality of cross-sectional shapes Sc are generated. The determination of rotational symmetry is made for each of the cross-sectional shapes Sc. Therefore, if the value of r(θ) is constant for all the cross-sectional shapes Sc, it is determined that the object is rotational symmetric without an angular period. If the area E is not less than the threshold for one or more cross-sectional shapes Sc, it is determined that the object is rotational symmetric. For some cross-sectional shapes Sc, if the area E is less than the threshold and r(θ) is constant for all remaining cross-sectional shapes, it is determined that the object is rotational symmetric with an angular period.

Also, for all cross-sectional shapes Sc, even if the area E is less than the threshold, the object may not be rotational symmetric with an angular period if the angular period $\omega_{max}$ is different between cross-sectional shapes Sc. Specifically, if the angular periods $\omega_{max}$ is different in all the cross-sectional shapes Sc and do not overlap, the object is not rotational symmetric with an angular period. For example, if the angular period $\omega_{max}$ is 60 degrees in one cross-sectional shape and the angular period $\omega_{max}$ is 72 degrees in the remaining cross-sectional shapes, the object is not rotational symmetric with an angular period. Conversely, if the angular period $\omega_{max}$ is 60 degrees in one cross-sectional shape and the angular period $\omega_{max}$ is 30 degrees in the remaining cross-sectional shapes, the object is rotational symmetric with an angular period. In other words, the object is six-fold rotational symmetric.

If the object is rotational symmetric with an angular period (S311), the correction unit 160 corrects the initial reference coordinate system as in Step S106 in FIG. 2. The correction unit 160 may correct the axial direction of the initial reference coordinate system based on a peak plane. For example, the correction unit 160 sets the reference coordinate system so that the direction of the angle $\theta_{max}$ at which r(θ) becomes maximum is the axial direction. The correction unit 160 specifies $\theta_{max}$ at which r becomes maximum. Here, $\omega_{max}$ is 0 degrees or more and less than 360 degrees.

The peak position is the position of the cross-sectional shape Sc or the cross-sectional shape So that becomes r($\theta_{max}$). The correction unit 160 sets a straight line inclined from the x-axis by an angle $\theta_{max}$ as an axis b. In FIG. 6, $\theta_{max}$ is 0 degrees. The axis b is a straight line passing through the origin and the peak position. The plane containing the selected axis (axis a) and axis b is the peak plane. If there are a plurality of angles θ at which r(θ) becomes maximum, the axis b may be set based on the peak position of one of these angles.

Figure 9:
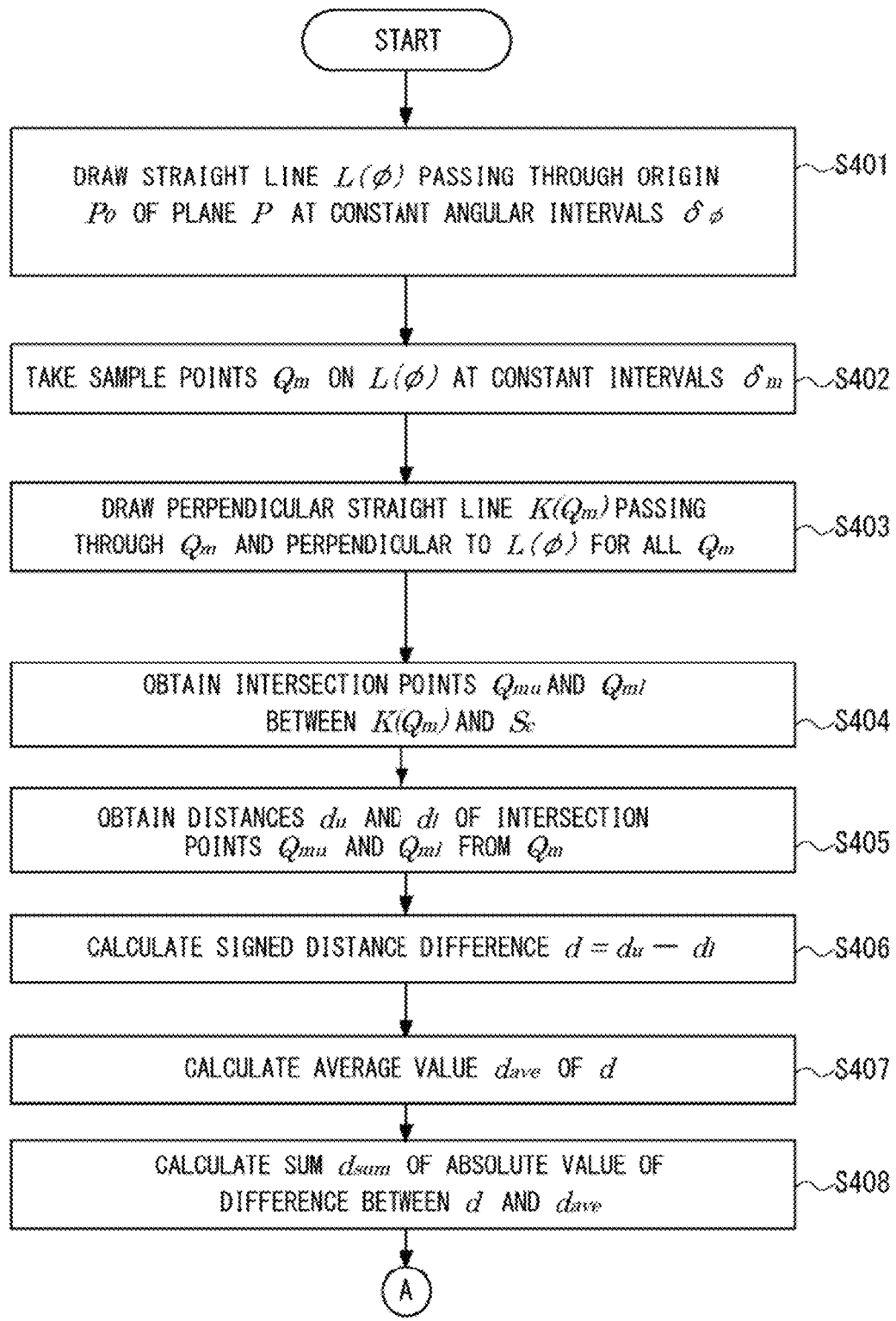
FIG. 9 is a flowchart showing processing of determining plane symmetry.
Figure 10:
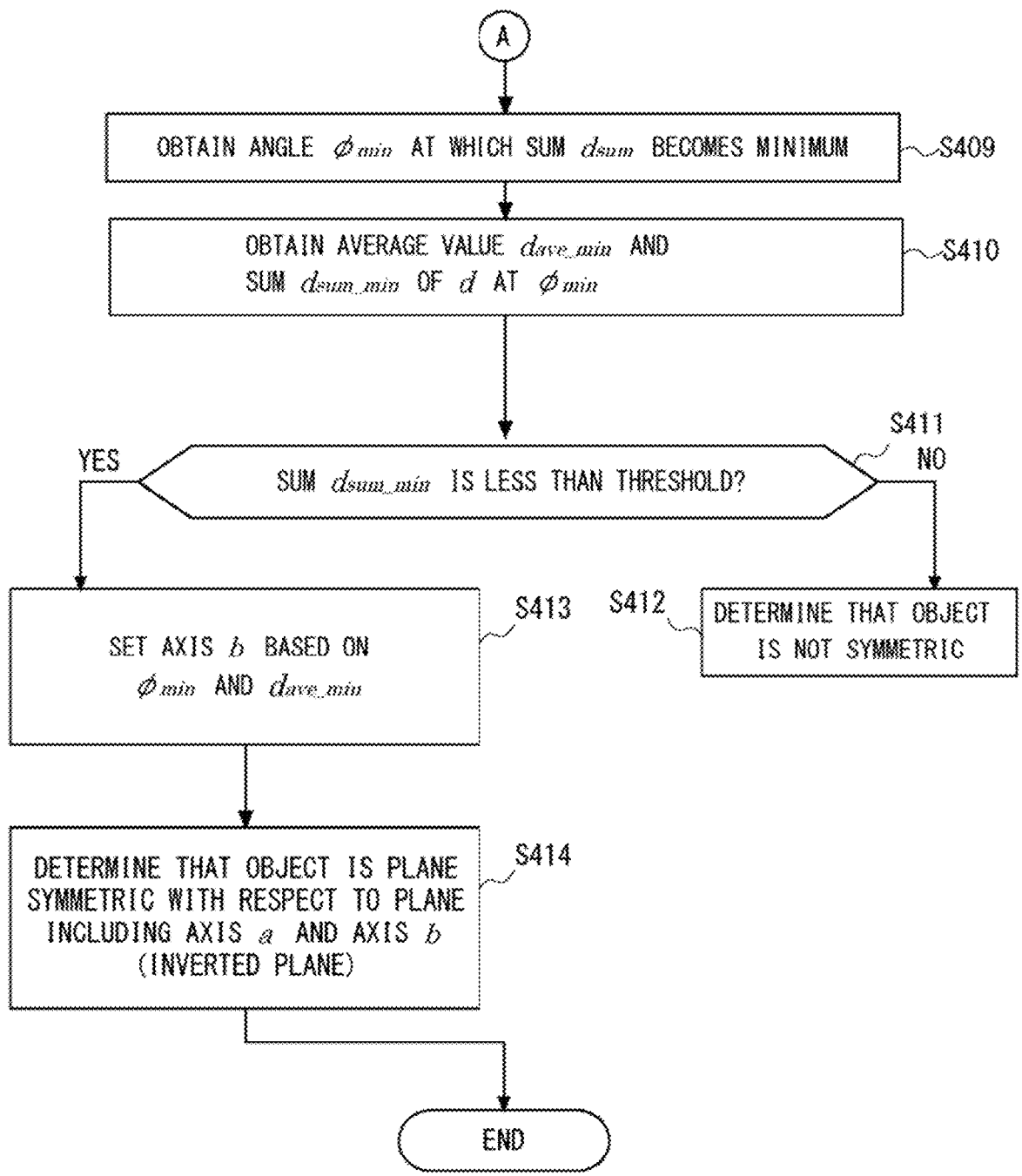
FIG. 10 is a flowchart showing processing of determining plane symmetry.
Figure 11:
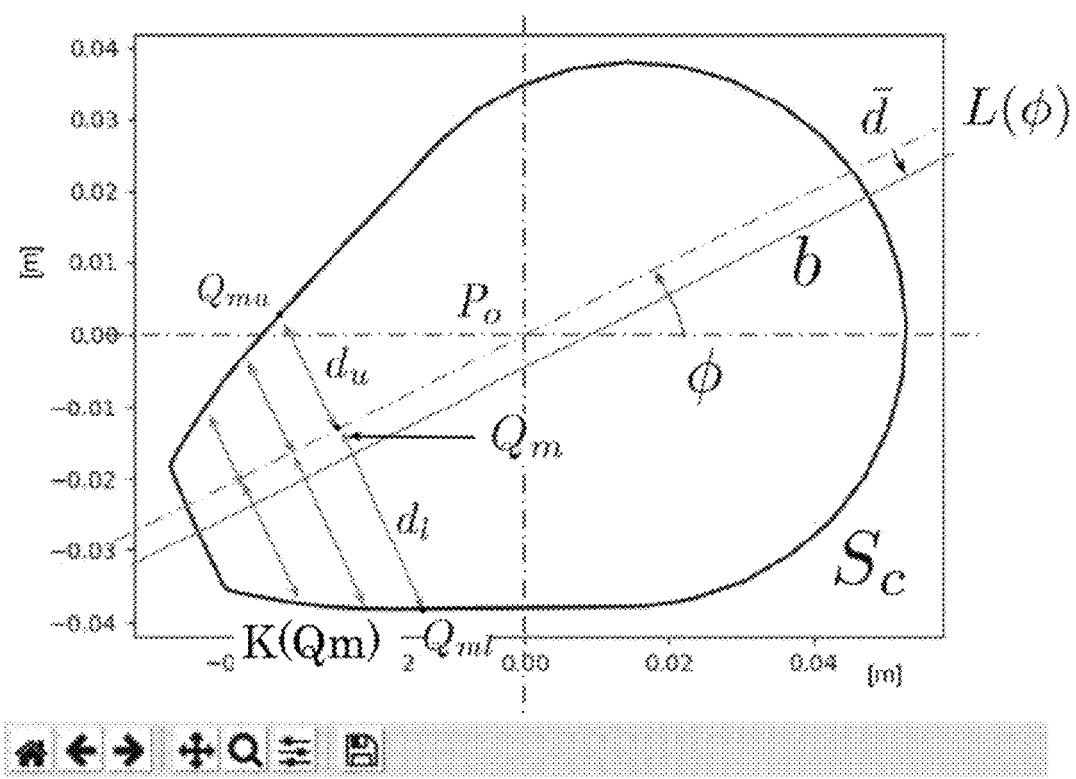
FIG. 11 shows a cross-sectional shape in the processing of determining the plane symmetry.

After Step S312, the third determination unit 150 determines the plane symmetry as in Step S107. An example of the determination about the plane symmetry will be described with reference to FIGS. 9 to 11. FIGS. 9 and 10 are flowcharts showing an example of the determination processing. FIG. 11 shows the plane-symmetric cross-sectional shape. In the following description, the processing is performed on the cross-sectional shape Sc of the convex hull, but it is also possible to perform the processing on the cross-sectional shape So of the object. Therefore, it is also possible to replace the cross-sectional shape Sc with the cross-sectional shape So in the following flow.

The third determination unit 150 draws straight lines L(φ) passing through the origin Po of the plane P at a constant angular intervals $\delta_\varphi$ (S401). Thus, in the plane P, a plurality of the straight lines L(φ) are set. Here, the straight line L(φ) is, as shown in FIG. 11, a straight line on the plane P that passes through the origin Po and forms an angle φ with the x-axis. That is, the angle φ is the angle formed by the x-axis and the straight line L(φ) in the plane P. Also, φ is in the range of 0 or more and less than 180 degrees. The straight line L(φ) is set to cross the cross-sectional shape Sc.

The third determination unit 150 takes sample points Qm on the straight line L(φ) at regular intervals δm (S402). Thus, a plurality of points on the straight line (φ) can be sampled. The third determination unit 150 records xy coordinates of each sample point Qm. FIG. 11 shows the straight line L(φ) and some of the sample points Qm on the straight line L(φ). Only three sample points placed on one straight line L(φ) are shown here. In addition, the third determination unit 150 draws the plurality of straight lines L(φ) by changing the angle φ. The third determination unit 150 obtains the plurality of sample points Qm on each straight line L(φ). Unless otherwise noted in the following description, the same processing is performed for each cross-sectional shape.

Figure 12:
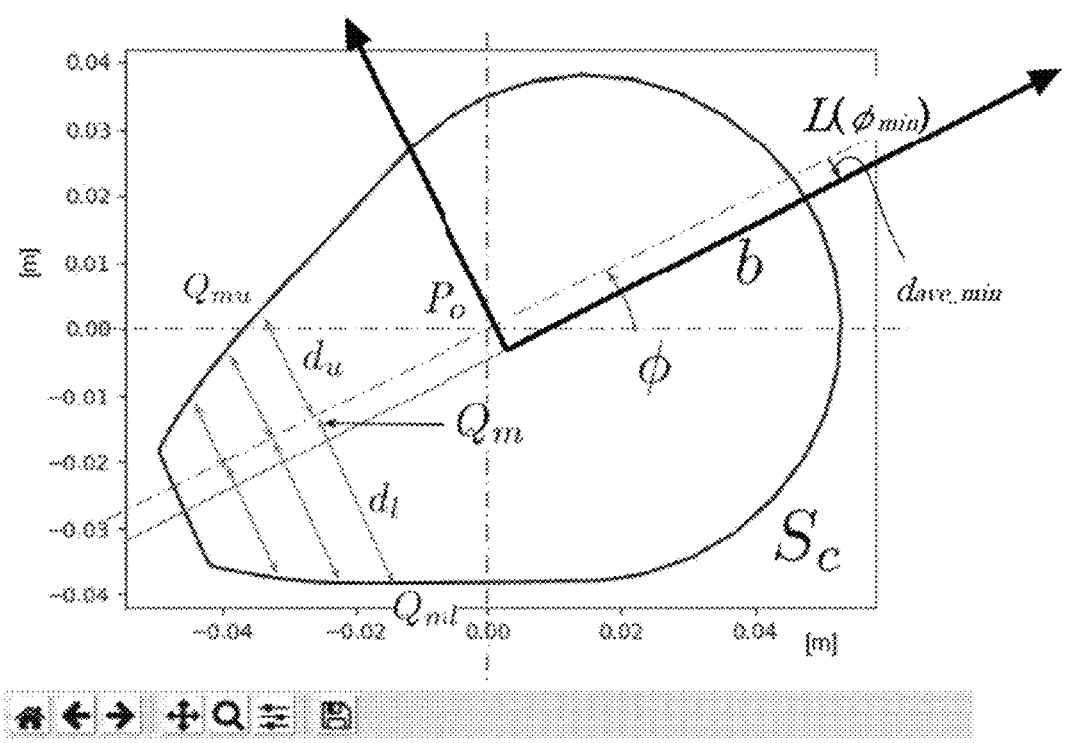
FIG. 12 is a diagram for explaining processing of correcting an axis in the processing of determining the plane symmetry.

For all sample points Qm, the third determination unit 150 draws a perpendicular straight line K(Qm) passing through Qm and perpendicular to the straight line L(φ) (S403). The third determination unit 150 obtains the intersection points Qmu and Qml between K(Qm) and the cross-sectional shape Sc (S404). Here, as shown in FIG. 11, since K(Qm) is a straight line crossing the cross-sectional shape Sc of the convex hull, K(Qm) intersects the cross-sectional shape Sc at two points. Therefore, as shown in FIG. 12, the positive intersection point between K(Qm) and the cross-sectional shape Sc is defined as Qmu, and the negative intersection point between K(Qm) and the cross-sectional shape Sc is defined as Qml. When K(Qm) intersects the cross-sectional shape Sc at three or more points, the outermost intersection point on the positive side is defined as Qmu, and the outermost intersection point on the negative side is defined as Qml.

The third determination unit 150 obtains the distances du and dl of the intersection points Qmu and Qml, respectively, from the sample point Qm (S405). The third determination unit 150 determines the distance du between the sample point Qm and the intersection point Qmu and the distance dl between the sample point Qm and the intersection point Qml as shown in FIG. 12.

Next, the third determination unit 150 calculates the signed distance difference d=du−dl (S406). The third determination unit 150 calculates the average value $d_{ave}$ of d (S407). The third determination unit 150 calculates the average value $d_{ave}$ by calculating the sum of d and dividing the sum by the number of sample points for the plurality of sample points Qm on one straight line L(φ). The third determination unit 150 calculates the sum $d_{sum}$ of the absolute values of the difference between d and $d_{ave}$ (S408). The sum $d_{sum}$ can be obtained by the following Expression (2).

[Expression 2]

$$d_{sum} = \sum |d - d_{ave}| \quad (2)$$

The third determination unit 150 determines the angle $\varphi_{min}$ at which the sum $d_{sum}$ becomes the minimum (S409). As described above, the signed distance difference d, the average value $d_{ave}$, and the sum $d_{sum}$ are obtained for each angle φ. That is, for each of the straight lines L(φ), the third determination unit 150 calculates the signed distance difference d, the average value $d_{ave}$, and the sum $d_{sum}$ by performing the above processing. The third determination unit compares the plurality of sums $d_{sum}$ to obtain the minimum sum $d_{sum}$, and obtains the angle φ of the straight line L(φ) at that time. The angle φ at which the cross-sectional shape Sc is closest to the line symmetry (inversion symmetry) for the straight line L(φ) is set as the angle $\varphi_{min}$.

The third determination unit 150 obtains the average value $d_{ave\_min}$ and the sum $d_{sum\_min}$ of the signed distance difference d at the angle $\varphi_{min}$ (S410). The third determination unit 150 determines whether or not the sum $d_{sum\_min}$ is less than a threshold (S411). The third determination unit 150 compares the sum $d_{sum\_min}$ with a preset threshold.

If the sum $d_{sum\_min}$ is not less than the threshold (NO in S411), the third determination unit 150 determines that the object is not symmetric (S412). That is, for axis a, the cross-sectional shape Sc (or the cross-sectional shape So) is neither rotationally symmetric nor plane symmetric. Thus, the object has no symmetry about the axis a.

If the sum $d_{sum\_min}$ is less than the threshold (YES in S411), the correction unit 160 sets the axis b based on $\varphi_{min}$ and $d_{ave\_min}$ (S413). Specifically, the axis b is a straight line with an angle of φ with respect to the x-axis and separated by $d_{ave\_min}$ from the origin Po. FIG. 12 shows the axis b in the plane P perpendicular to the z-axis. The axis b corresponds to a straight line which is obtained by translating the straight line L(φmin) by $d_{ave\_min}$ in the direction perpendicular to the straight line. Also, the position of the origin Po is similarly translated. The direction perpendicular to the axis b and perpendicular to the axis a becomes the remaining axis c. The third determination unit 150 determines that the object is plane symmetric with respect to the plane including the axis a and the axis b (inverted plane) (S414). Thus, when the object O has plane symmetry, the correction unit 160 corrects the axial direction of the initial reference coordinate system so that the initial reference coordinate system has an axis along the inverted plane.

Note that the processing of determining the plane symmetry shown in FIGS. 9 and 10 is performed for each cross-sectional shape Sc. Then, for all cross-sectional shapes Sc, if the sum $d_{sum\_min}$ is less than the threshold and the axis b is common, the object is determined to be the surface symmetric. The processing shown in FIGS. 3 to 12 is an example of the determination processing, and this embodiment is not limited to the above processing.

The system 1 performs the above determination processing on each of the three axes of the initial reference coordinate system. That is, the symmetry on each of the three axes is determined. If it is determined that the object is rotationally symmetric with no angular period on two or more axes, the object is determined to have a spherical shape. If the object is rotationally symmetric on one axis and plane symmetric on the other, the object has two symmetries, such as a cylinder or a rugby ball shape. If the object is rotationally symmetric on one axis, it can be determined whether or not the object has symmetry with an angular period (discrete symmetry) or a symmetry with an angular period. Discrete symmetrical cross-sectional shapes include regular polygons and star-shaped shapes. Various symmetries can be determined by the above algorithm.

In summary, the processing apparatus 100 performs the following processes (1)-(6).
  (1) deriving an initial reference coordinate system based on measurement data indicating a three-dimensional shape of an object;
  (2) selecting an axis of the initial reference coordinate system;
  (3) determining whether or not there is rotational symmetry about the axis;
  (4) determining whether or not there is rotational symmetry with an angular period about the axis;
  (5) when there is no rotational symmetry, determining plane symmetry about the axis; and
  (6) performing processing of (3)-(5) for each of three axes of the initial reference coordinate system by changing the axis selected in (2).

In this way, an appropriate coordinate system can be set. A three-dimensional coordinate system set as above is then used to represent a three-dimensional model of the object. In other words, a three-dimensional model showing the three-dimensional shape of the object is represented in the appropriate coordinate system. For example, a point cloud indicating a three-dimensional model or the position coordinates of a mesh are represented in the appropriate coordinate system. Information about various symmetries can be annotated. Three-dimensional shape models can be created with coordinate axes taking symmetry into consideration.

The processing apparatus 100 derives initial reference coordinates from the three-dimensional model. Then, the processing apparatus 100 can perform the calculation efficiently by sequentially searching the rotational symmetry and the plane symmetry in each axis. Information about coordinate system settings and symmetry for three-dimensional shape models of objects can be annotated. Three-dimensional models in appropriate coordinate systems can be efficiently generated.

For objects with symmetry, the axis of the coordinate system defines the axis of symmetry or the plane of symmetry (inverted plane). When the object has rotational symmetry with an angular period or plane symmetry, the correction unit 160 corrects the initial reference coordinate system. By using the axes of the corrected coordinate system, the position and posture of the object can be changed appropriately. Creation of learning data can be done easily and appropriately. Furthermore, position and posture information indicating position and posture can be annotated appropriately and simply to the learning data. It then becomes possible to set a useful coordinate system for the estimation of six-axis position and posture in the estimator.

The coordinate system setting unit 120 may derive the initial reference coordinates based on the direction of the normal to each mesh of the mesh model showing the three-dimensional shape. Thus, an appropriate initial reference coordinate system can be easily determined.

The coordinate system setting unit 120 defines a cuboid containing the object O as a three-dimensional bounding box. Next, the coordinate system setting unit 120 derives an initial reference coordinate system with the center of the cuboid as the origin and each side direction of the cuboid as the xyz axis.

If the object has plane symmetry, the correction unit 160 corrects the axial direction of the initial reference coordinate system so that the initial reference coordinate system has an axis along the inverted plane.

If the object has rotational symmetry with an angular period, the correction unit 160 corrects the axial direction of the initial reference coordinate system based on the peak plane.

Figure 13:
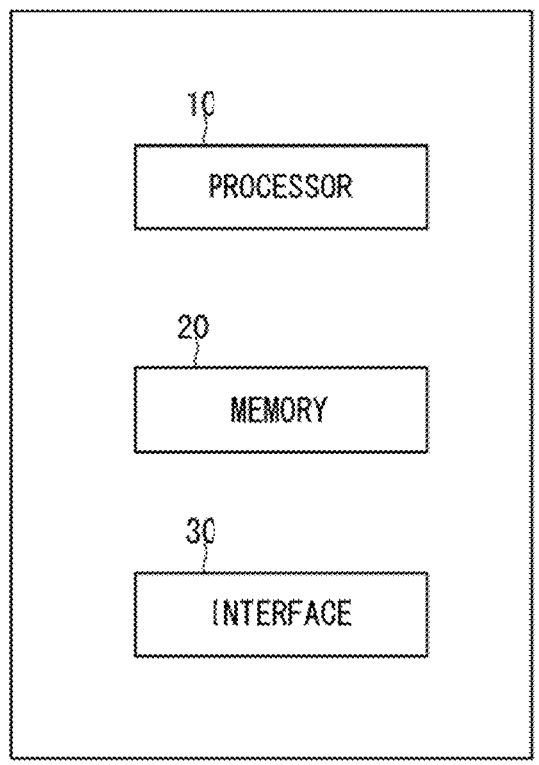
FIG. 13 is a block diagram showing an example of a hardware configuration of a processing apparatus 100.

The above processing methods can be implemented by computer programs and hardware. That is, when the processing apparatus 100 executes predetermined programs, it functions as a generation apparatus or a generation system. FIG. 13 shows an example of a hardware configuration of the processing apparatus 100. The processing apparatus 100 includes a processor 10, a memory 20, an interface 30, and so on. The memory 20 stores programs, various parameters, measurement data, and so on. The processor 10 executes programs stored in the memory 20. The interface 30 transmits data to the sensor 200. The interface 30 also receives data from the sensor 200.

When the processor 10 of the processing apparatus 100 executes the program, the method according to this embodiment can be executed. The processing apparatus 100 may have at least one processor 10. One or more processors 10 then execute the programs stored in the memory to perform the above processing. The processing apparatus 100 is not physically limited to a single apparatus, but may be distributed among a plurality of apparatuses. That is, the above methods may be executed by a plurality of apparatuses performing distributed processing.

Some or all of the above processing may be executed by a computer program. That is, the control of the above processing apparatus 100 is executed when the control computer constituting the processing apparatus 100 executes the program. The above program includes instructions (or software codes) that, when loaded into a computer, cause the computer to perform one or more of the functions described in the embodiment. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

Although the disclosure made by the inventor has been described in detail based on the embodiment, the disclosure is not limited to the above embodiment, and it is obvious that various modifications can be made without departing from the scope of the disclosure.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A method for generating a three-dimensional model performed by at least one processor, the method comprising:
   (1) deriving an initial reference coordinate system based on measurement data indicating a three-dimensional shape of an object, wherein an orientation of the object is changed a plurality of times and the measurement data represents a distance from a depth sensor to the object, and wherein the initial reference coordinate system has three axes, which are perpendicular to each other;
   (2) selecting an axis of the initial reference coordinate system;
   (3) determining whether or not there is rotational symmetry about the axis;
   (4) when there is rotational symmetry, determining whether the rotational symmetry has an angular period about the axis;
   (5) when there is no rotational symmetry, determining plane symmetry about the axis;
   (6) performing processing of (3)-(5) for each of the remaining two axes of the initial reference coordinate system by changing the axis selected in (2); and
   (7) generating the three-dimensional model of the object based on the initial reference coordinate system.

2. The method for generating a three-dimensional model according to claim 1, wherein when there is the rotational symmetry with the angular period or when there is the plane symmetry, the initial reference coordinate system is corrected.

3. The method for generating a three-dimensional model according to claim 1, wherein
the initial reference coordinate system is derived based on a direction of a normal to each mesh of a mesh model indicating the three-dimensional shape.

4. The method for generating a three-dimensional model according to claim 1, wherein
a cuboid containing the object is used as a three-dimensional bounding box and a center of the cuboid is used as an origin, and then the initial reference coordinate system is derived with each side direction of the cuboid as one of the three axes, respectively.

5. The method for generating a three-dimensional model according to claim 1, wherein
when there is the plane symmetry, an axial direction of the initial reference coordinate system is corrected to change a direction of the two axes other than the selected axis.

6. The method for generating a three-dimensional model according to claim 1, wherein
when there is the rotational symmetry with the angular period, setting a straight line inclined from the selected axis, by an angular period that is the maximum angular period, as an axis b that passes through an origin of the object and a peak position of the angular periods, wherein a plane containing the selected axis and axis b is a peak plane, and an axial direction of the initial reference coordinate system is corrected based on the peak plane.

7. A system for generating a three-dimensional model including at least one processor, the processor performing:
(1) deriving an initial reference coordinate system based on measurement data indicating a three-dimensional shape of an object, wherein an orientation of the object is changed a plurality of times and the measurement data represents a distance from a depth sensor to the object, and wherein the initial reference coordinate system has three axes, which are perpendicular to each other;
(2) selecting an axis of the initial reference coordinate system;
(3) determining whether or not there is rotational symmetry about the axis;
(4) when there is rotational symmetry, determining whether the rotational symmetry has an angular period about the axis;
(5) when there is no rotational symmetry, determining plane symmetry about the axis;
(6) performing processing of (3)-(5) for each of the remaining two axes of the initial reference coordinate system by changing the axis selected in (2); and
(7) generating the three-dimensional model of the object based on the initial reference coordinate system.

8. The system for generating a three-dimensional model according to claim 7, wherein
when there is the rotational symmetry with the angular period or when there is the plane symmetry, the initial reference coordinate system is corrected.

9. The system for generating a three-dimensional model according to claim 7, wherein
the initial reference coordinate system is derived based on a direction of a normal to each mesh of a mesh model indicating the three-dimensional shape.

10. The system for generating a three-dimensional model according to claim 7, wherein
a cuboid containing the object is used as a three-dimensional bounding box and a center of the cuboid is used as an origin, and then the initial reference coordinate system is derived with each side direction of the cuboid as one of the three axes, respectively.

11. The system for generating a three-dimensional model according to claim 7, wherein
when there is the plane symmetry, an axial direction of the initial reference coordinate system is corrected to change a direction of the two axes other than the selected axis.

12. The system for generating a three-dimensional model according to claim 7, wherein
when there is the rotational symmetry with the angular period, setting a straight line inclined from the selected axis, by an angular period that is the maximum angular period, as an axis b that passes through an origin of the object and a peak position of the angular periods, wherein a plane containing the selected axis and axis b is a peak plane, and an axial direction of the initial reference coordinate system is corrected based on the peak plane.

13. A non-transitory computer readable medium storing a program for causing a computer to execute a method for generating a three-dimensional model, the method comprising:
(1) deriving an initial reference coordinate system based on measurement data indicating a three-dimensional shape of an object, wherein an orientation of the object is changed a plurality of times and the measurement data represents a distance from a depth sensor to the object, and wherein the initial reference coordinate system has three axes, which are perpendicular to each other;
(2) selecting an axis of the initial reference coordinate system;
(3) determining whether or not there is rotational symmetry about the axis;
(4) when there is rotational symmetry, determining whether the rotational symmetry has an angular period about the axis;
(5) when there is no rotational symmetry, determining plane symmetry about the axis;
(6) performing processing of (3)-(5) for each of the remaining two axes of the initial reference coordinate system by changing the axis selected in (2); and
(7) generating the three-dimensional model of the object based on the initial reference coordinate system.

* * * * *